United States Patent [19]
Sato

[11] Patent Number: 5,429,318
[45] Date of Patent: Jul. 4, 1995

[54] BAITCASTING REEL HAVING A LOCKING DEVICE DISPOSED LATERALLY OF A REEL BODY

[75] Inventor: Jun Sato, Sakai, Japan

[73] Assignee: Shimano Inc., Osaka, Japan

[21] Appl. No.: 953,869

[22] Filed: Sep. 30, 1992

[30] Foreign Application Priority Data

Oct. 4, 1991 [JP] Japan .................. 3-080793 U
Nov. 20, 1991 [JP] Japan .................. 3-304443

[51] Int. Cl.6 .......................................... A01K 89/015
[52] U.S. Cl. ................................................. 242/314
[58] Field of Search ............... 242/312, 313, 314, 315, 242/319

[56] References Cited

U.S. PATENT DOCUMENTS

| | | | |
|---|---|---|---|
| 693,459 | 2/1902 | Sutton | 242/314 |
| 842,551 | 1/1907 | Hunter | 242/312 X |
| 1,005,154 | 10/1911 | Catucci | 242/314 X |
| 1,812,220 | 6/1931 | Shakespeare, Jr. | 242/314 |
| 4,852,826 | 8/1989 | Sato | 242/319 |
| 5,120,002 | 6/1992 | Kawai | 242/314 |
| 5,156,351 | 10/1992 | Cittadini | 242/319 |

FOREIGN PATENT DOCUMENTS 3-12666 12/1928 Japan .
54-43031 12/1979 Japan .
2-81172 6/1990 Japan .

*Primary Examiner*—Daniel P. Stodola
*Attorney, Agent, or Firm*—Dickstein, Shapiro & Morin

[57] ABSTRACT

A baitcasting reel has a reel body containing a spool and defining a lateral opening through which the spool is removable. This opening is closed by a detachable member. The detachable member is locked to the reel body through engagement between a pair of screws projecting from the reel body and a pair of nuts supported by the detachable member. The nuts define gears meshed with a ring gear rotatable by a dial. The detachable member is unlocked for detachment by turning the dial.

1 Claim, 10 Drawing Sheets

BAITCASTING REEL HAVING A LOCKING DEVICE DISPOSED LATERALLY OF A REEL BODY

BACKGROUND OF THE INVENTION

1. Field of the Invention

This invention relates to a baitcasting reel, and more particularly to an improvement in a baitcasting reel in which a detachable member is disposed laterally of a reel body or forms part of a lateral wall of the reel body. With the detachable member detached from the reel body, the latter presents an opening through which a spool may be removed. A locking device is provided to lock the detachable member to the reel body.

2. Description of the Related Art

A baitcasting reel as constructed above is disclosed in Japanese Utility Model Publication Kokai No. 2-81172, for example. This reel has a disc-shaped detachable member, a reel body defining a circular opening opposed to one side of a spool, and a latch type locking device pivotable into and out of engagement with a peripheral inner wall of the opening and a peripheral outer wall of the detachable member. The detachable member may be rotated to become loose from or tight to the reel body.

In one type of commercially available baitcasting reels, a side plate (detachable member) extending from a region of a level winder to a rear end region is separable from a reel body. The separation is achieved by manipulating a plurality of bolts flocking device) extending transversely through the reel body.

Compared with this type of reel on the market, the reel disclosed in the above publication allows the detachable member to be detached or locked in place by manipulating a single component, thus providing the advantage of a quick and easy detaching or locking operation. However, this construction requires the detachable member to have a disc shape, and the reel body to define an opening for receiving the detachable member. In addition, the latch type locking device must be formed between the reel body and detachable member. All this requires a relatively high degree of precision. Thus, there is room for improvement in terms of cost and manufacturing precision.

With this prior construction, it is necessary to provide a dimensional control for an outside diameter of the detachable member and an inside diameter of the opening to the extent of allowing relative rotation and yet precluding chattering therebetween. The locking device also requires a relatively high degree of precision to enable separation and locking through a predetermined amount of rotation of the detachable member.

Furthermore, with the reel disclosed in the above-noted publication, it is difficult to form the opening of the reel body in shapes other than circular for receiving the detachable member. It is also difficult to inspect components, e.g. the level winder, other than the spool. In this sense too, there is room for improvement.

The reel found on the market allows the detachable member to be detached or attached without any problem by manipulating the bolts even where the detachable member is shaped to cover a side of the reel body. According to this construction, however, a plurality of bolt heads (control knobs) project laterally of the reel body to impair smoothness to the touch. Further, since the bolts extend through the reel body, spaces must be secured in the reel body for receiving these bolts.

SUMMARY OF THE INVENTION

An object of the present invention is to provide an improved baitcasting reel having a locking device for allowing a detachable member to be detached or locked quickly as in the prior art but without requiring a very high degree of precision, and a reel body presenting a large opening laterally thereof when the detachable member is detached.

The above object is fulfilled, according to the present invention, by a baitcasting reel comprising a detachable member detachable from a reel body to render a spool removable through an opening appearing after detaching the detachable member, and a locking device for detachably locking the detachable member to the reel body, wherein the locking device includes a plurality of coupling mechanisms rotatable to lock and unlock the detachable member, and a single control mechanism for simultaneously rotating the coupling mechanisms.

The above features may be arranged as shown in FIGS. 1 and 2, for example. For separating or locking a detachable member 14, a control mechanism E may be operated to simultaneously switch a plurality of coupling mechanisms D to a coupling state or a separating state. The detachable member 14 in this construction need not be disc-shaped as in the prior art disclosed in the Japanese publication noted hereinbefore. The control mechanism E may only have a drive transmitting function to operate the coupling mechanisms D. It is therefore unnecessary for the control mechanism E and coupling mechanisms D to have a high degree of precision.

Thus, according to this construction, as in the prior art disclosed in the Japanese publication, the detachable member 14 may be separated or locked with little trouble by operating the single control mechanism. The control mechanism E in the present invention does not require a high degree of precision. In addition, the present invention allows the reel body to present a large lateral opening when the detachable member is separated therefrom.

In another aspect of the present invention, a baitcasting reel comprises a detachable member detachable from a reel body to render a spool removable through an opening appearing after detaching the detachable member, and a locking device for detachably locking the detachable member to the reel body, wherein the locking device includes a plurality of engaging pieces, a single cam rotatable for simultaneously engaging and disengaging from the engaging pieces to lock and unlock the detachable member, and a control member for operating the cam.

The above features may be arranged as shown in FIGS. 6 and 7, for example. For separating or locking a detachable member 14, a control member 24 may be operated to cause a cam 23 to simultaneously engage or disengage from a plurality of engaging pieces 22. In this construction also, the detachable member 14 need not be disc-shaped.

According to this construction, as in the prior art disclosed in the Japanese publication, the detachable member 14 may be separated or locked with little trouble by operating the single control member. Further, the present invention allows the reel body to present a large lateral opening when the detachable member is separated therefrom.

Thus, the present invention provides a construction having a locking device which allows the detachable member to be detached or locked quickly as in the prior art but without requiring a high degree of precision, and a reel body presenting a large opening laterally thereof when the detachable member is detached for facilitating inspection of varied components as well as the spool.

The present invention does not require bolt-receiving spaces inside the reel body. Moreover, there is no bolt head protecting laterally of the reel, which results in smoothness to the touch.

In a further aspect of the invention, a baitcasting reel comprises a reel body supporting a handle, and including a frame opposed to one side of a spool, and a case covering an outer region of the frame, wherein a locking device allows relative rotation between the frame and case about an axis of the spool, and includes a coupling mechanism for coupling the frame and case to be separable by the relative rotation therebetween.

The above features may be arranged as shown in FIGS. 8 through 10, for example. For disassembling a reel body A to which a handle 4 is connected, a frame F and a case H are rotated relative to each other whereupon a coupling mechanism J reaches a state for allowing separation between the frame F and case H. After the case H is separated from the frame F, access may be made to the interior of the reel body A. For assembling the reel body A, the frame F and case H are placed in an appropriate relative position and rotated relative to each other. Then the coupling mechanism J interconnects the frame F and case H.

According to this reel, as shown in FIG. 8, the coupling mechanism J may include lugs 41 formed on the frame F, and engaging portions 43 formed on the case H to be engageable with and disengageable from the lugs 41. This construction does not require a movable member as provided in the prior art (e.g. the construction described in Japanese Utility Model Publication No. 54-43031). Moreover, since the lugs 41 and engaging portions 43 may be formed directly on the frame F and case H, the reel body has a strong structure free of chattering. There is no bolt head or the like exposed from outer surfaces of the reel body for connecting the frame F and case H.

Thus, the present invention provides an improved baitcasting reel which does not include a large and strong movable member, has outer surfaces of the reel body smooth to the touch, and allows the reel body having the handle to be disassembled in a one-touch operation for facility of adjustment and repair.

Particularly in the construction shown in FIG. 8, the angler holds the case and handle in one hand, and the left reel body and frame in the other when assembling or disassembling the reel body. This operation is easier than where a small control piece or bolts are manipulated.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Baitcasting reels according to the present invention will be described in detail hereinafter with reference to the drawings.

Figure 4:
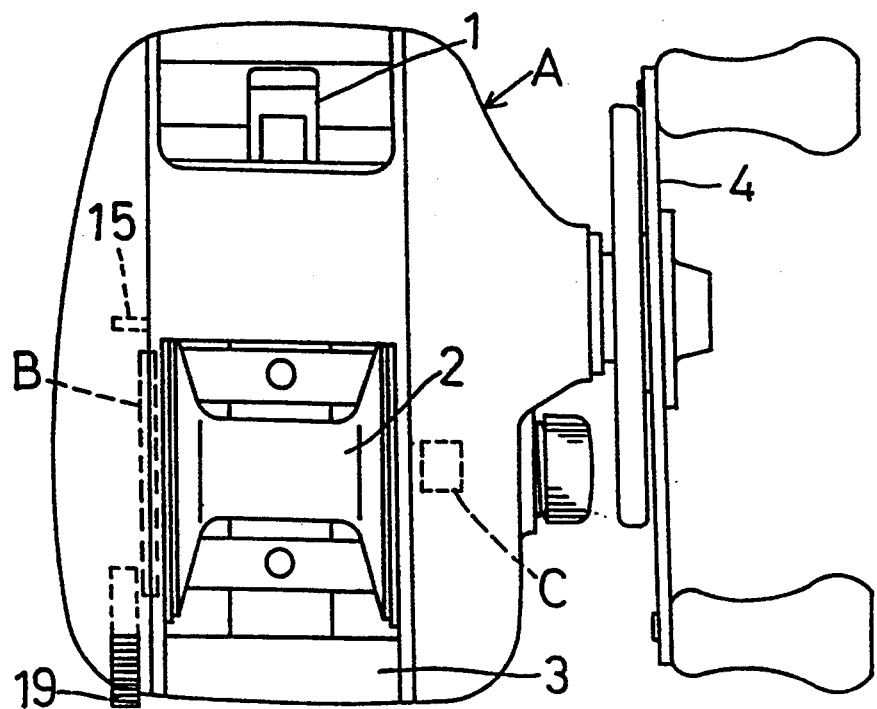
FIG. 4 is a plan view of the entire reel.

As shown in FIG. 4, a baitcasting reel comprises a reel body A including a left case and a right case, and supporting a level winder 1, a spool 2 and a thumb rest 3 arranged in the stated order from front to back. The right case of the reel body A has a handle 4 attached thereto, and contains a clutch mechanism C. The left case contains a brake mechanism B.

Figure 3:
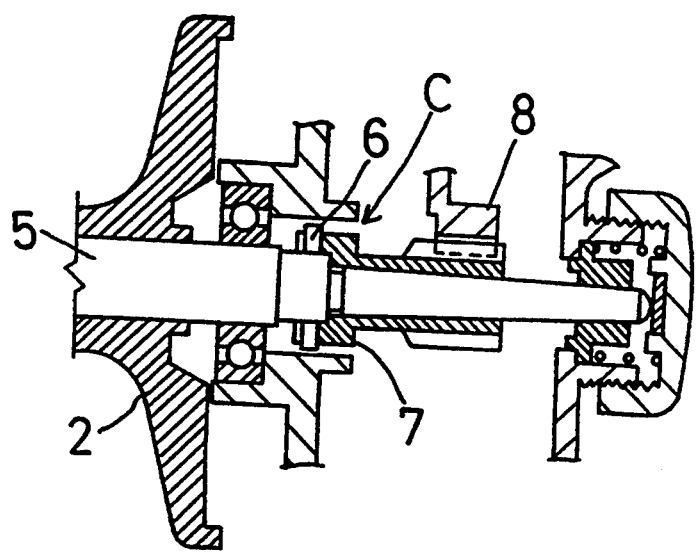
FIG. 3 is a sectional view of a clutch structure.

As shown in FIG. 3, the clutch mechanism C includes a pin 6 fixed to an end portion of a spool shaft 5, and a clutch sleeve 7 slidably mounted on the spool shaft 5 for engaging the pin 6. An outer surface of the spool shaft 5 and an inner surface of the sleeve 7 are both tapered so that the sleeve 7 is spaced from the spool shaft 5 when in a disengaged position.

The sleeve 7 receives drive from the handle 4 through an output gear 7 of a drag mechanism (not shown).

Figure 2:
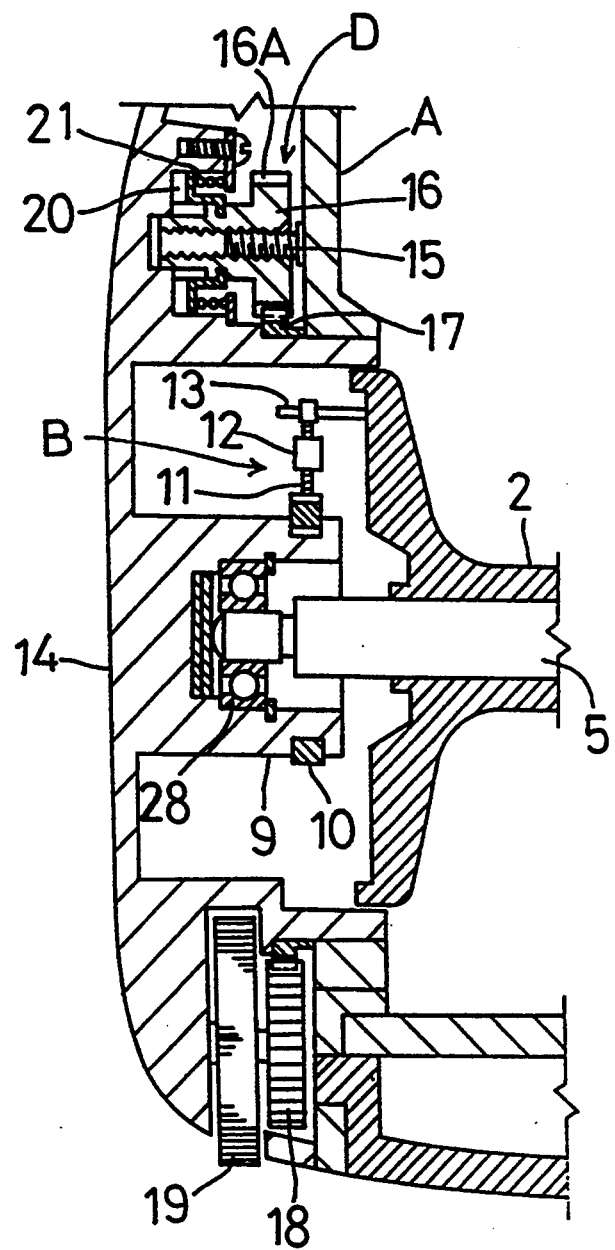
FIG. 2 is a sectional view of the coupling mechanism and control mechanism.

As shown in FIG. 2, the brake mechanism B includes a brake belt 10 wound around a supporting boss 9 of a beating 28 supporting a left end of the spool shaft 5, a weight 12 meshed with a screw shaft 11 fixed to an outer periphery of the brake belt 10, and a contact piece 13 extending from a side surface of the spool 2 to transmit torque from the spool 2 to the screw shaft 11. At a baitcasting time, the contact piece 13 contacts the screw shaft 11 to revolve the weight 12. Then the weight 12 produces a centrifugal force to press the brake belt 10 upon the supporting boss 9, thereby applying a braking force to the spool 2.

The braking force of this braking mechanism B is adjustable by varying position of the weight 12 relative to the screw shaft 11.

Figure 1:
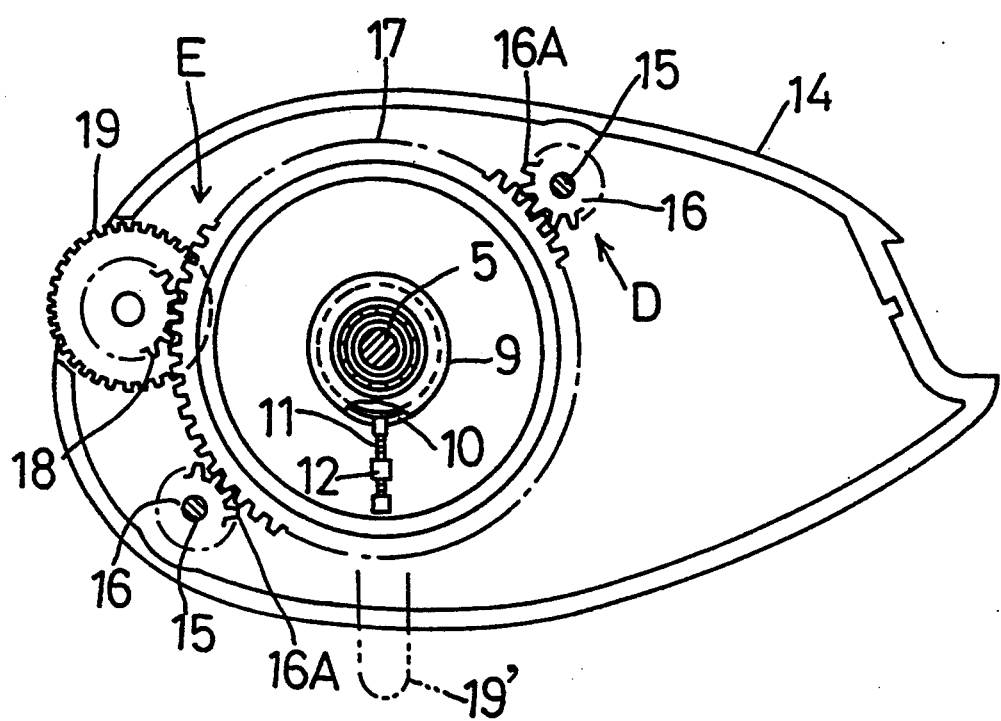
FIG. 1 is a side view showing a coupling mechanism and a control mechanism of a baitcasting reel according to the present invention.
Figure 5:
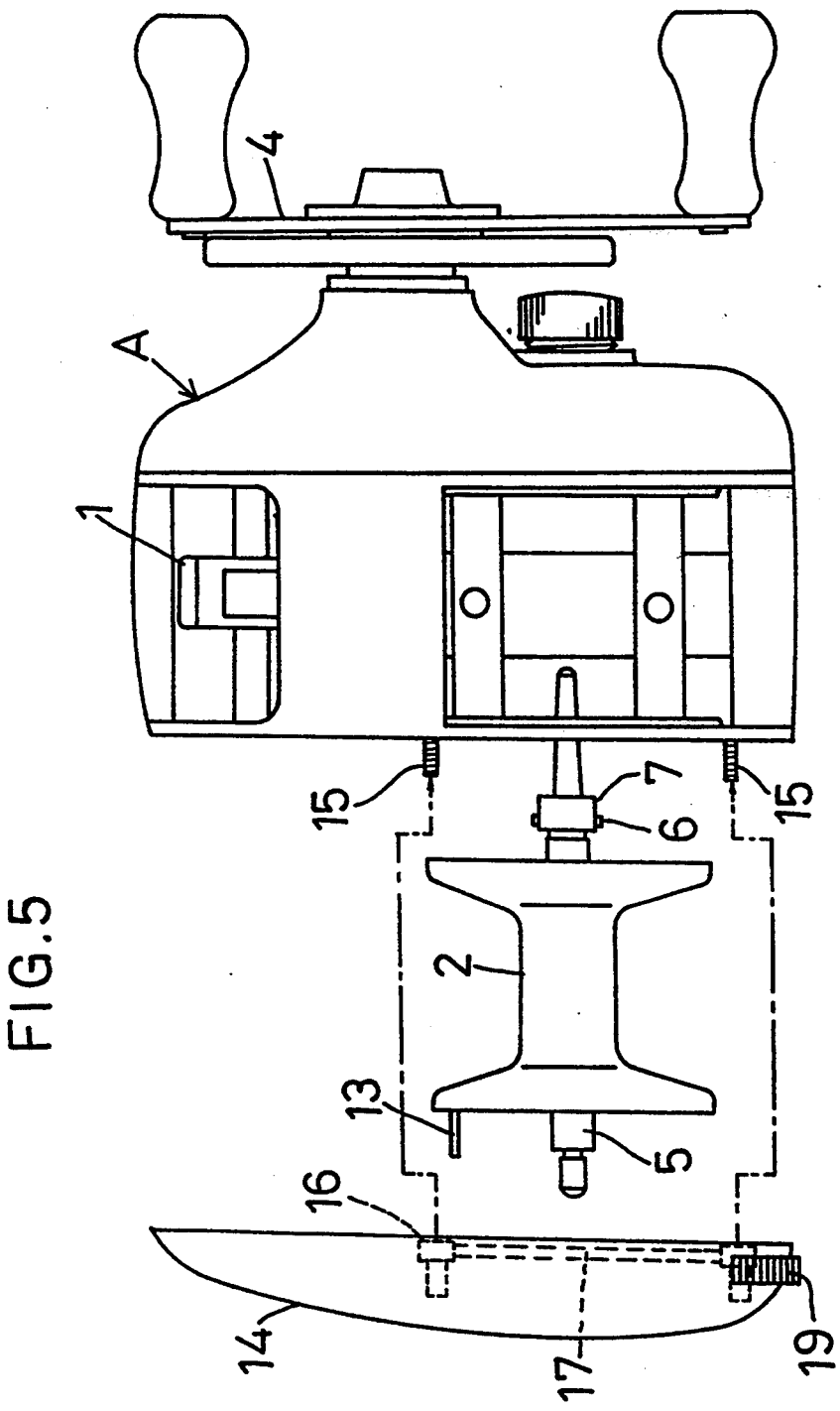
FIG. 5 is a plan view of the entire reel with a detachable member removed.

This reel has a lid-like detachable member 14 acting as the left case of the reel body A. The detachable member 14 is connected to the reel body A through a locking device to be detachable by a simple operation. When necessary, the spool 2 may be removed or the brake mechanism B may be adjusted through an opening formed when the detachable member 14 is detached. The locking device includes a coupling mechanism D and a control mechanism E as shown in FIGS. 1, 2 and 5. The coupling mechanism D includes a pair of screws 15 projecting from the reel body A, and a pair of nuts 16 supported on the detachable member 14. The control mechanism E includes a ring gear 17 meshed with gears 16A of the nuts 16, and a dial 19 for rotating the ring gear 17 through a control gear 18. For locking or detaching the detachable member 14, the dial 19 is turned to rotate the nuts 16 simultaneously through the ring gear 17.

As shown in FIG. 2, each nut 16 is constantly biased against the detachable member 14 and away from the reel body A by a shifter 20 and a spring 21. Thus, the detachable member 14 may be locked in place free of chattering.

Another embodiment will be described next.

The reel body A in this embodiment has the same basic structure as in the foregoing embodiment, but includes the following locking device.

Figure 6:
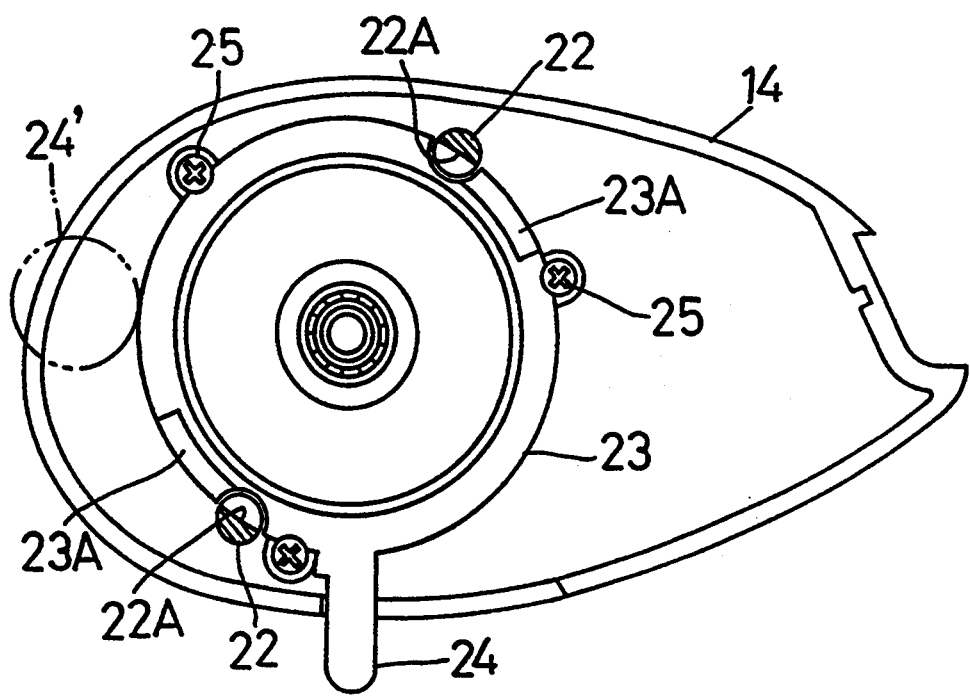
FIG. 6 is a side view showing engaging pieces and a cam.
Figure 7:
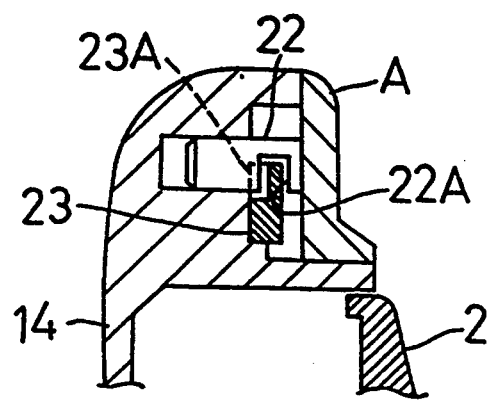
FIG. 7 is a sectional view of an engaging piece and the cam.

As shown in FIGS. 6 and 7, this locking device includes a pair of engaging pieces 22 projecting from the reel body A, an annular cam 23 rotatable for simultaneously engaging and disengaging from cutouts 22A of the engaging pieces 22 to lock and unlock the detachable member 14, and a control lever 24 for operating the cam 23. For locking or unlocking the detachable member 14, the control lever 24 is swung to move cam surfaces 23A of the cam 23 simultaneously to engage or disengage from the engaging pieces 22.

The cam surfaces 23A are inclined in a circumferential direction of the cam 23. The cam 23 is retained in place by a plurality of screws 25.

It is also possible, as shown in a phantom line in FIG. 1, to provide a control lever 19' for the ring gear 17. Similarly, a control dial 24', as shown in a phantom line in FIG. 6, may be meshed with an outer periphery of the cam 23.

The present invention may be worked in various other forms. For example, the detachable member may be provided in the right half of the reel where the handle is attached. The control mechanism may include a cord-like element such as an endless chain for simultaneously operating a plurality of components of the coupling mechanism. The cam may be slidable into and out of engagement with the plurality of engaging pieces.

A further embodiment will be described hereinafter.

Figure 10:
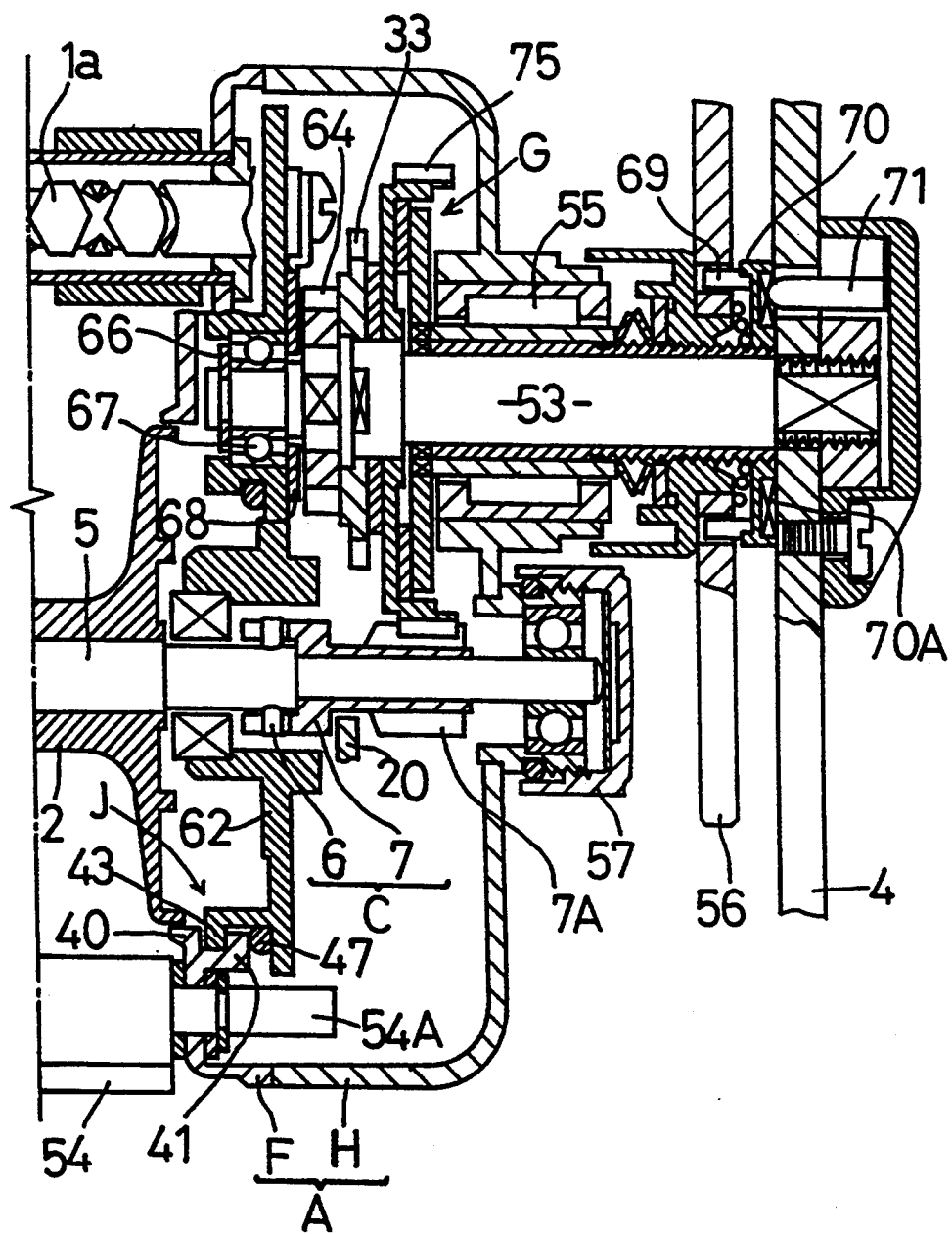
FIG. 10 is a sectional view of a right half of the reel.
Figure 11:
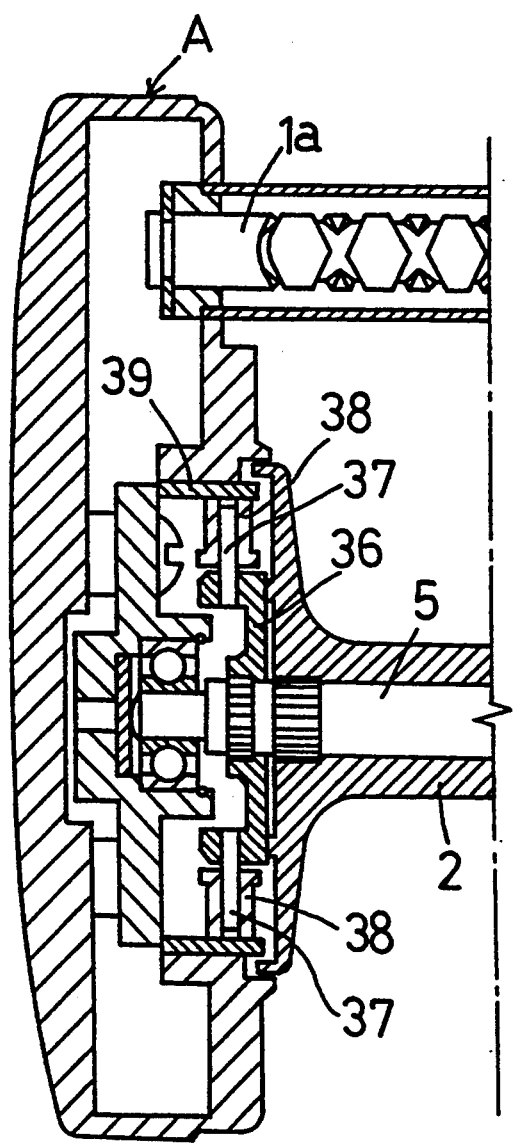
FIG. 11 is a sectional view of a left half of the reel.
Figure 13:
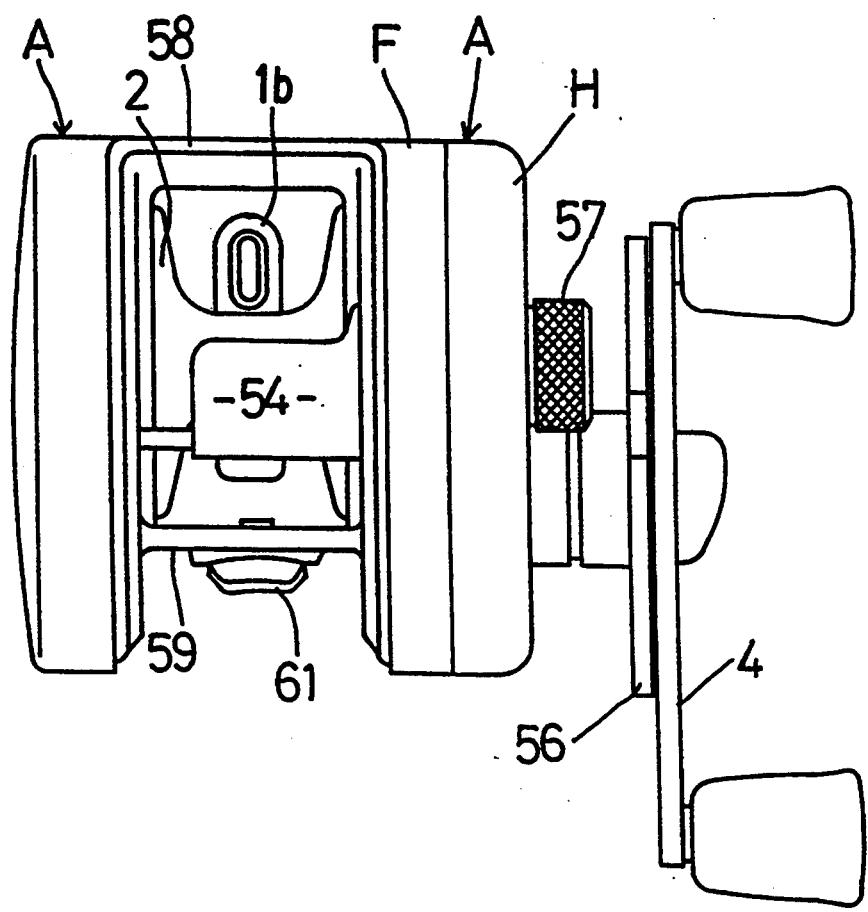
FIG. 13 is a rear view of the reel.

As shown in FIGS. 10, 11 and 13, a baitcasting reel comprises right and left reel bodies A, and a level wind mechanism mounted in a front position between the reel bodies A. The level wind mechanism includes a screw shaft 1a, and a line guide 1b reciprocable right and left with rotation of the screw shaft 1a. Further, the reel bodies A have a spool 2 mounted centrally thereof and a clutch controller 54 mounted in a rear position. The right reel body A supports a handle 4, a drag controller 56, and a cast controller 57.

In this reel, parts of the left reel body A and right reel body A, and an upper thumb rest 58 and a pair of lower frames 59 are formed into an integral unit by aluminum die casting. To form the right reel body A, a case H is connected to a frame F continuous from a right end of the integral unit. A mounting foot 61 extends between the pair of lower frames 59 to be secured to a fishing rod.

Figure 12:
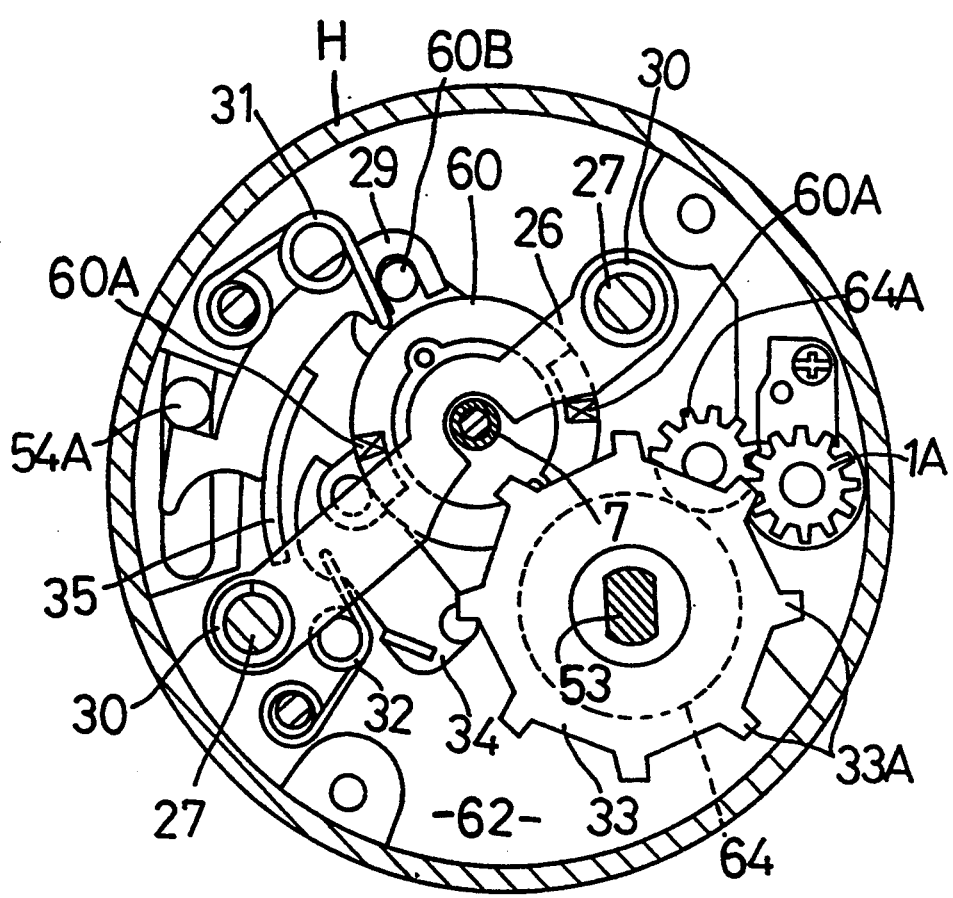
FIG. 12 is a sectional view showing a transmission system.

As shown in FIGS. 10 and 12, the handle 4 and drag controller 56 are mounted on a handle shaft 53 extending from a plate 62 disposed inside the right reel body A. The handle shaft 53 supports a drag mechanism G and an output gear 64 mounted on an inward end portion thereof. A roller type one-way clutch 55 is disposed between the handle shaft 53 and case H to prevent backward turning of the handle 4. As shown in FIG. 12, drive is transmitted from the handle 4 through the output gear 64 and an intermediate gear 64A to an input gear 1A of the screw shaft 1a.

An inward end of the handle shaft 53 is supported by the plate 62 through a bearing 67 held in place by a stopper ring 66 and a retainer 68. This support structure is strong against an external force acting axially of the handle shaft 53. The drag controller 56 has a disc 70 disposed on a side thereof opposed to the handle 4. The disc 70 is rotatable with the drag controller 56, and defines a toothed surface 70A. The handle 4 includes a leaf spring 71 for engaging the toothed surface 70A of the disc 70 to produce a clicking sound. Thus, the angler may grasp an amount of operation of the drag controller 56 from the clicking sound.

A clutch mechanism C includes a clutch sleeve 7 slidably mounted on a spool shaft 5, and a pin 22 fixed to the spool shaft 5 to be engageable with the clutch sleeve 7. The clutch sleeve 7 has an input gear 7A meshed with an output gear 75 of the drag mechanism G, whereby torque from the handle 4 is transmitted to the spool 5 through the drag mechanism G and clutch mechanism C.

As shown in FIG. 12, the clutch sleeve 7 is engaged with a shifter 26 slidably supported on a pair of support shafts 27. A rotary cam 60 is rotatably mounted coaxially with an axis of the spool 2. This rotary cam 60 defines a pair of cam surfaces 60A for operating the clutch sleeve 7 through the shifter 26. The rotary cam 60 has an engaging pin 60B engaged with a link element 29 operable through contact with a control pin 54A of the clutch controller 54.

Compression springs 30 are mounted on the support shafts 27 for causing the shifter 26 to engage the clutch mechanism C. A toggle spring 31 acts on the rotary cam 60 to maintain the rotary cam 60 in a position to engage or a position to disengage the clutch mechanism C. A further toggle spring 32 acts on a return arm 34 to switch the arm 34 to a position in which an end thereof interferes with a return wheel 33 when the clutch mechanism C is set to a disengaged position.

When disengaging the clutch mechanism C, the clutch controller 54 is depressed to impart an operating force through the control pin 54A to place the link element 29 into contact with a guide 35. Then the link element 29 moves describing an arcuate locus while in contact with the guide 35, to rotate the rotary cam 60. As a result, the clutch sleeve 7, through pressure contact with the cam surfaces 60A, moves to a disengaged position. When engaging the clutch mechanism C, the handle 4 is turned in a direction to take up a fishing line. This causes a tooth 33A of the wheel 33 to push the return arm 34, whereby the rotary cam 60 is operated in a clutch engaging direction. Consequently, the shifter 26 moves under the urging force of compression springs 30 to engage the clutch mechanism C.

As shown in FIG. 11, the left reel body A contains a centrifugal brake mechanism including collars 38 slidably mounted on rods 37 extending from a holder 36 fixed to the spool shaft 5, and an annular friction member 39 disposed outwardly of a locus of revolution of the collars 38.

The frame F and case H are rotatable relative to each other about the axis of the spool 2. A coupling mechanism J is provided for allowing detachment of the case H from the frame F through this relative rotation.

Figure 8:
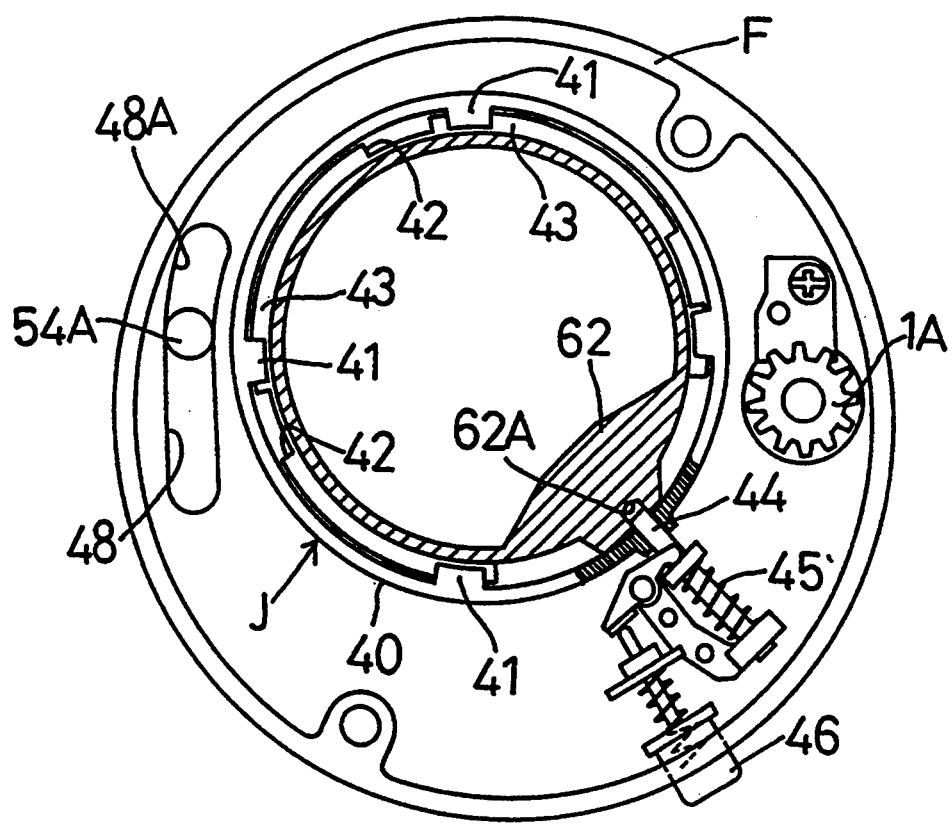
FIG. 8 is a sectional view of a coupling mechanism in a locking state according to a different embodiment of the invention.
Figure 9:
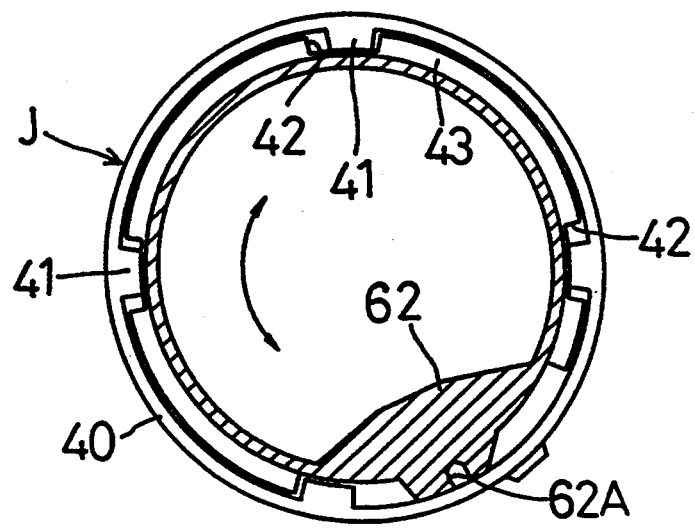
FIG. 9 is a sectional view of the coupling mechanism in an unlocking state.

As shown in FIGS. 8 through 10, the frame F includes a tubular portion 40 defining an opening through which the spool 2 may be moved into and out of the reel. A plurality of lugs 41 are arranged around an inner peripheral wall of the tubular portion 40 defining the opening. The plate 62 defines cutouts 42, and flange-like engaging portions 43 continuous with the cutouts 42. The lugs 41, cutouts 42 and engaging portions 43 constitute the coupling mechanism J. For detaching the case H from the frame F, the angler disengages a lock piece 44, then holds the case H and handle 4 in one hand, holds the left reel body A and frame F in the other hand, and turns the two hands in opposite directions about the spool axis. This cancels engagement between the lugs 41, and engaging portions 43 to render the case H separable. This operation is reversed for attaching the case H. When the case H is in place relative to the frame F, the lock piece 44, under the force of a spring 45, moves to a locking position to complete attachment of the case H.

The lock piece 44 is releasable by means of a push type control element 45. This lock piece 44 is operable through engagement with an engaging bore 62A formed in the plate 62. An O-ring 47 is mounted between the plate 62 and lugs 41 to prevent chattering in the locked state.

The case H is detachable from the frame F by turning the case H clockwise as seen from the handle 4. To facilitate this detaching operation, an upward allowance 48A is given to a slot 48 formed in the frame F for receiving the pin 54A of the clutch controller 54. As shown in FIG. 12, the input gear 1A of the screw shaft 1a is meshed with the intermediate gear 64A on an extension line linking the center of rotation of the coupling mechanism J (which is coaxial with the spool shaft 5) and the intermediate gear 64A.

This embodiment may be modified to include the coupling mechanism in the left reel body remote from the handle. Further, each of the right and left reel bodies may be arranged detachable through this coupling mechanism.

What is claimed is:

1. A baitcasting reel comprising:

a spool;

a reel body including a frame and a case covering an outer region of said frame, said reel body supporting said spool;

a transmission system mounted in said reel body for transmitting drive from a handle to said spool;

a coupling mechanism including a plurality of lugs arranged around an inner periphery of a tubular portion of said frame defining a spool-inserting opening, a plurality of cutouts disposed inside said reel body and defined in a plate provided on said case, and a plurality of flange-like engaging portions engageable with said lugs and continuous with said cutouts, said coupling mechanism being operable to couple said frame with said case through a relative rotation thereof about an axis of said spool; and locking means for locking said frame to said case, said locking means including a lock piece and a control piece provided in said frame between an outer periphery of said frame and said tubular portion, a control portion of said control piece being exposed to the outside of said frame, such that, with depression of said control piece in a direction substantially normal to said spool axis, said lock piece is moved away from said plate in said direction substantially normal to said spool axis.

* * * * *